(12) United States Patent
Eschenbeck et al.

(10) Patent No.: US 7,182,195 B2
(45) Date of Patent: Feb. 27, 2007

(54) PARKING LOCK OF AN AUTOMATIC TRANSMISSION

(75) Inventors: Linus Eschenbeck, Wangen-Neuravensburg (DE); Markus Hoher, Tettnang (DE); Stefan Csajagi, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 157 days.

(21) Appl. No.: 11/011,013

(22) Filed: Dec. 13, 2004

(65) Prior Publication Data

US 2005/0133338 A1    Jun. 23, 2005

(30) Foreign Application Priority Data

Dec. 17, 2003    (DE) ............................... 103 59 326

(51) Int. Cl.
*F16H 63/38*    (2006.01)
(52) U.S. Cl. .................................. 192/219.5

(58) Field of Classification Search .............. 192/219.5
See application file for complete search history.

(56) References Cited

U.S. PATENT DOCUMENTS 3,610,004 A * 10/1971 Neese ........................ 70/218
4,369,867 A * 1/1983 Lemieux .................. 192/219.5
4,719,999 A    1/1988 Ohkubo

FOREIGN PATENT DOCUMENTS

DE    36 36 978 A1    5/1987
JP    09-207731 A *    8/1997

* cited by examiner

*Primary Examiner*—Rodney H. Bonck
(74) *Attorney, Agent, or Firm*—Davis & Bujold, P.L.L.C.

(57) ABSTRACT

A parking lock of an automatic transmission avoiding an undesirable engagement of a lock member (2) in a parking lock gear, during occurring extreme accelerations in normal driving of a motor vehicle. An arrester (7) is provided which, in the driving gear stages of the transmission, retains the lock member (2) with an arresting shape fit.

6 Claims, 2 Drawing Sheets

PARKING LOCK OF AN AUTOMATIC TRANSMISSION

This application claims priority from German Application Serial No. 103 59 326.8 filed Dec. 17, 2003.

FIELD OF THE INVENTION

The invention concerns a parking lock for an automatic transmission with a parking lock gear directly bound to the transmission output shaft.

BACKGROUND OF THE INVENTION

Such a parking lock has been disclosed by DE 36 36 978 A1. The output of this transmission is directly connected to a parking lock gear, so that, when in parking mode, a locking member in the form of a parking lever, upon option, can be lockingly brought into engagement with toothing of the parking lock gear. A push-rod, which is indirectly connected with a selection lever of the transmission, carries a conical cam, which, in the parking position of the said selection lever, brings the locking member into such a position, that the parking lock brake gear is in the locked condition. Thereby, by this establishment of the parking position and with even an unfavorable relative position of the park locking gear, an engagement can securely be made, if the said cam is spring loaded and slidably placed on the insertion rod. To this end, the said push-rod carries a molded on connection, upon which a compression spring can anchor, which then exerts force on the said cam. So that, in a case of extreme vibration, which can act upon this known transmission, the lock member, which is in the driving mode, can undesirably contactingly engage with the parking lock gear, there is provided on the insertion rod a braking member spring in the form of a leaf-spring. This spring is so designed, that in a driving gear stage, it exerts its resilient force on the lock member, and works against an engagement of the lock member in the parking lock gear.

In cases of increased demands, in regard to resistance of a parking lock mechanism to vibratory disturbance, in order hold the locking lever free from engagement in the parking lock gear, the force of the leaf spring must be made greater. Due to substantial friction caused by the spring, an increased expenditure of force is created between the leaf spring and the locking lever. As a result, an axial sliding of the cam is initiated, and thus an increased expenditure of force appears at the selector lever. Such increased demands can, for example, occur with motor vehicles equipped with such parking locks, if these are driven at excessive speeds over unlevel obstructions or in off-the-road courses.

Giving consideration to this background, thus the purpose of the invention is to create a parking lock for an automatic transmission of such a nature, that in the driving mode, even at extreme accelerations acting upon the transmission, contact between the locking lever and the parking lock gear is avoided.

SUMMARY OF THE INVENTION

The invention stipulates, that the conflict of purpose in the layout of the lock member spring cannot be solved by variations of the force of this lock member spring.

Accordingly, the invention provides an arrester which can be brought into contact with the lock member and immobilizes the same. The parking lock mechanism, when in the park position, releases this arrester in such a manner, that the lock member enters into engagement with the parking lock gear.

Advantageous, when this occurs, is that the arrester is conducive to a strict division of function in the parking lock, wherein the respective components can be dedicated to such functions as they were intended to perform. The true parking lock mechanism, which leads directly to a displacement of the lock member, can, to the greatest extent, be given entire freedom, for example, in the form of the known placement of a spring loaded, slidable cam on a push bar.

The lock member spring can be so directly placed, that the lock member, in all selector level positions, can be brought out of the parking position, withdrawn from the parking lock gear and placed in a position, wherein the separate arrester can make an engagement therewith. The spring force thereof can also be optimized for this purpose, and must not be adjustingly set to function only in a case of the eventually occurring, extreme acceleration. In this way, the activation forces directed at the selector lever remain at a minimum value.

By means of the separately designed arrester, forces acting on the lock member, which have been evoked by recurring accelerations, have been blocked, this being due to an effective transfer of force into the parking lock gear by means of the lock member.

In an advantageous embodiment, the said arrester is designed to be somewhat springlike in resilience, that is, it is made of band of thin, resilient sheet metal, somewhat extended in surface and capable of making a shape-fit with, and also restraining, the lock member. Preferentially, the said arrester is anchored at one end in the transmission housing, while on its free end, a component of the parking brake mechanism activates its release.

In an embodiment, which is particularly simple to construct and to install, the sheet metal band is placed to run essentially parallel to the lock member and is provided with an angled section, which engages itself into a corresponding recess of the said lock member.

In another preferred embodiment of the arrester, this appears, for example, as a spring loaded, piston-like arrester rod, which abuts itself on a transmission wall and vertically penetrates into a corresponding opening in the lock member.

BRIEF DESCRIPTION OF THE DRAWINGS

The invention will now be described, by way of example, with reference to the accompanying drawings in which.

DETAILED DESCRIPTION OF THE INVENTION

Figure 1:
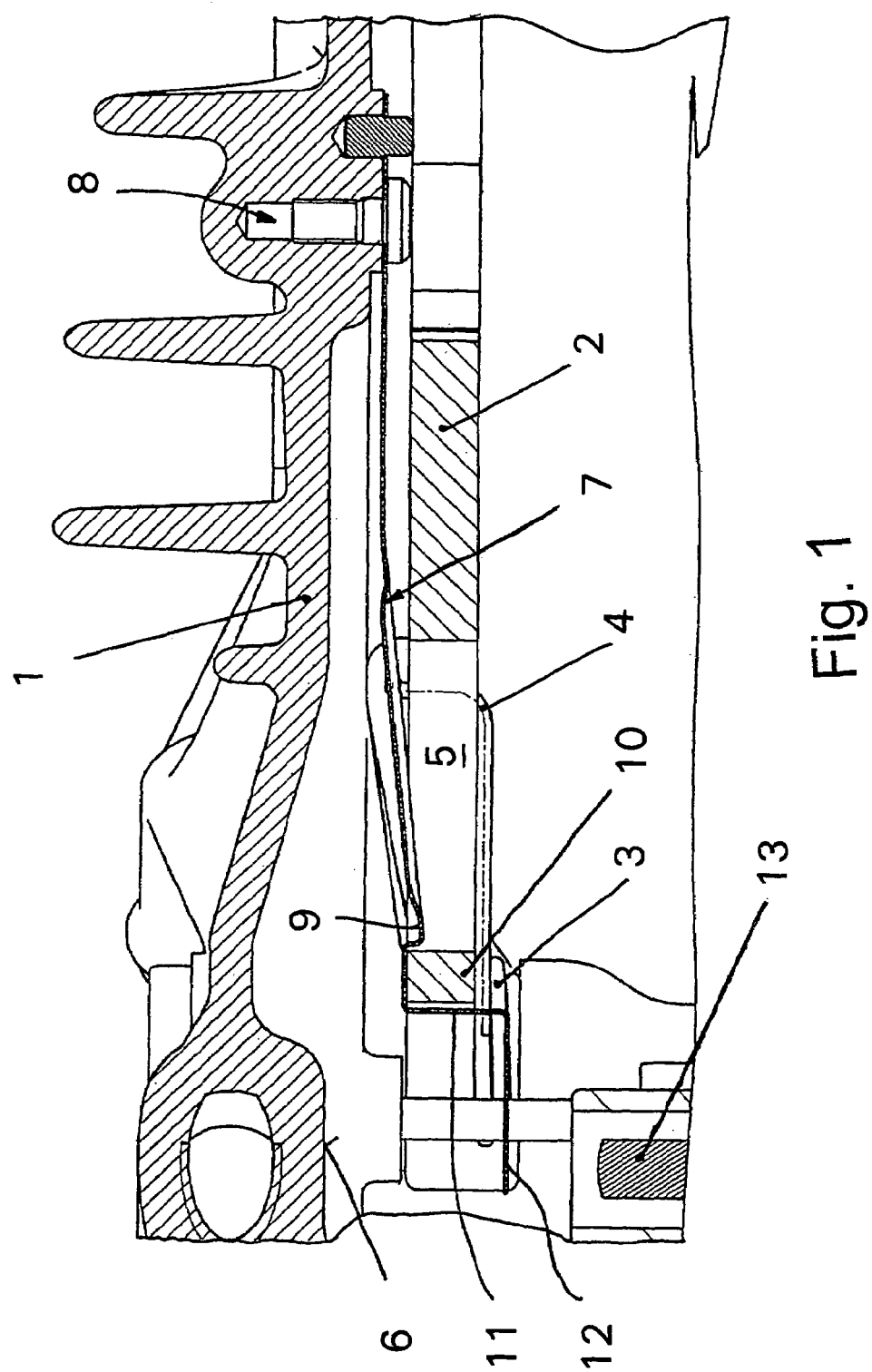
FIG. 1 a section through a parking lock apparatus in a driving gear mode of a transmission.

Within a housing 1 of an automatic transmission for a motor vehicle, is placed a parking lock gear underneath the plane of the drawing. This is fully connected to a transmission output drive. Outside of the drawing, in the direction of the said parking lock gear, and inside the housing, is placed a movable lock member 2, which is subjected to the force of a lock member spring 3, which in the form of a helical spring. The helical spring penetrates in common with an angular arm 4 thereof into a recess 5 in the lock member 2 and transmits in this way its spring force onto the lock member 2 in such a way, that this force acts counter to an engagement with the parking lock gear.

Between the housing inner wall 6 and the lock member 2 is placed an arrester 7 in the form of a springlike, resiliently designed sheet metal band. This band extends itself in a direction essentially parallel to the lock member 2 and one end is rigidly affixed to the housing inner wall 6 by means of a fastener 8. The generally leaf spring design of the sheet metal band 7 possesses on its free end an angular section 9, which, by means of the inherent force of the said springlike sheet metal band 7, in accord with FIG. 1, this section makes a shape-fit penetration into the recess 5. To the angular section 9 is attached a section 11, which restrainingly caps over a detent 10 of the lock member 2 and extends itself further to make a transition into an activation surface 12.

A piston 13, which forms a part of the parking lock mechanism is placed within the housing 1, slidably situated perpendicularly to the lock member 2. The part of the parking lock mechanism, which displaces the said lock member 2 need not be further described here, and can be manufactured by known methods in accord with the state of the technology.

The manner of functioning of the parking lock is as follows. In FIG. 1 is installed (but not shown) a selective lever of the automatic transmission for the purpose of forward or reverse travel. The piston 13 lies in its own retracted position, without making contact with the activation surface 12. The arrester 7, in its extended area running from the fastener 8, outward, possesses a plurality of shape fit coverings with the locking member 2, so that this is fixed in its relative position to the parking lock gear. All forces caused by extreme acceleration, which are directed to the transmission, and, because of this said shape fitting, also to the lock member 2, are totally absorbed, so that an undesirable engagement with the parking lock gear by excessive pressure from the helical spring 3 is excluded.

Figure 2:
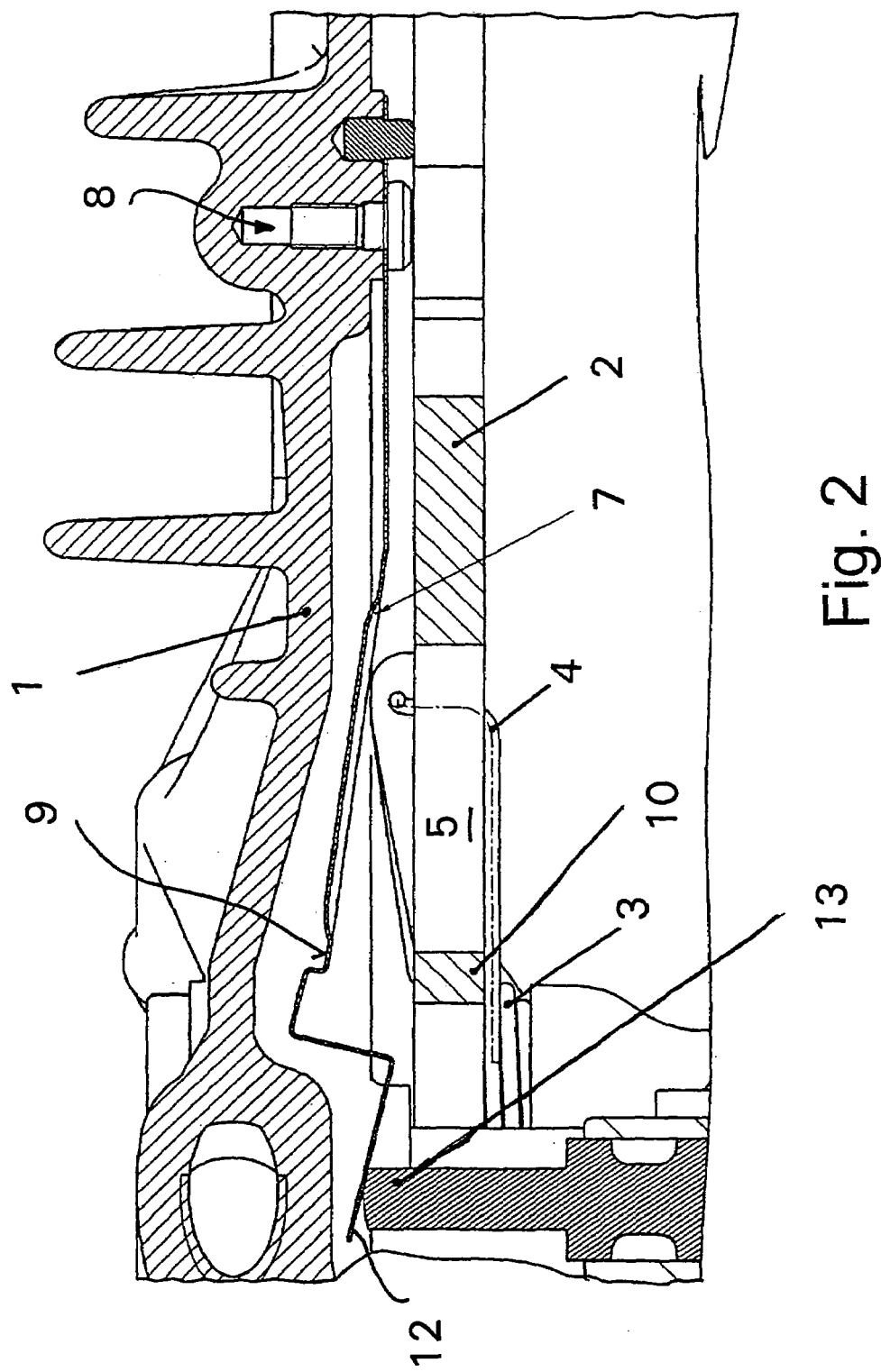
FIG. 2 a section through a parking lock apparatus in a parking mode of a transmission.

If the (not shown) selective lever is placed in the parking position, then by means of a known, mechanical transfer element, the piston 13 is advanced to the position shown in FIG. 2. When this is done, the piston 13 comes into contact with the activation surface 12 of the arrester 7 and raises this into the position as seen in FIG. 2. The lock member 2, as this proceeds, is released from the said restraint by the arrester 7 and moves to an arresting position, in which the parking lock gear is blocked.

REFERENCE NUMERALS 1 housing
2 lock member
3 lock member spring, helical type
4 arm
5 recess
6 housing inner wall
7 arrester of resilient sheet metal
8 fastener
9 angle section
10 detent
11 cover section
12 activation surface
13 piston

The invention claimed is:

1. An automatic transmission parking lock comprising:
a parking lock gear affixed to a transmission output drive,
an elongated lock member (2) that is longitudinally slidable in a direction along a longitudinal axis of the lock member (2) and that can be selectively brought into engagement with the parking lock gear when the transmission is placed in a parking position,
a lock member spring (3) engaging with the longitudinally slidable lock member (2) to resiliently bias the lock member (2) to counter engagement of the lock member (2) with the parking lock gear,
an arrester (7) movable in a direction substantially perpendicular to movement of the lock member (2) and engaging with the lock member (2) to non-resiliently restrain the lock member (2) from engagement with the parking lock gear when the transmission is in a position other than the parking position, and
when the transmission is moved into the parking position, an activation element (13) engages with the arrester (7) and disengages the arrester (7) from the lock member (2) so that the lock member (2) engages the parking lock gear.

2. The parking lock according to claim 1, wherein the arrester (7), is resilient and engages the lock member (2) by a shape fit of the arrester (7) to the lock member (2).

3. The parking lock according to claim 2, wherein the arrester (7) is made of sheet metal and is rigidly affixed to a housing (1) of the transmission.

4. The parking lock according to claim 3, wherein the sheet metal extends essentially parallel to the lock member (2) and possesses at least one angular section (9) and engages in a corresponding recess (5) of the lock member (2).

5. An automatic transmission parking lock comprising:
a parking lock gear affixed to a transmission output drive and an elongated lock member (2) that is slidable in a direction along a longitudinal axis of the lock member (2) for engaging the parking lock gear;
a lock member spring (3) resiliently biasing the lock member (2) to counter engagement of the lock member (2) with the parking lock gear;
a parking lock mechanism, which when the transmission is in a parking position, biases the lock member (2) into locking engagement with the parking lock gear; and
an arrester (7) for restraining the lock member (2) from engaging the parking lock gear when the transmission is in a position other than the parking position, and the arrester (7) being movable away from releasing the lock member (2) so that the parking lock mechanism biases the lock member (2) into locking engagement with the parking lock gear when the transmission is in the parking position.

6. An automatic transmission parking lock comprising:
a parking lock gear affixed to a transmission output drive;
an elongated lock member (2) that is longitudinally slidable in a direction along a longitudinal axis of the lock member (2) toward the parking lock gear to engage the parking lock gear when the transmission is placed in a parking position;
a lock member spring (3) biasing the movable lock member (2) to counter engagement of the locking member (2) with the parking lock gear (3) for engaging the automatic transmission parking lock when the transmission is placed in a parking position;
an arrester (7) normally engaging with the lock member (2), when the transmission is in a position other than the parking position, and restraining the lock member (2) from engaging the parking lock gear, and the arrester (7) being movable, in a direction perpendicular to movement of the lock member (2), by an activation element (13) when the transmission is moved into the parking position, to permit the lock member spring (3) to bias the lock member (2) into engagement with the parking lock gear (3).

* * * * *